Figure 1:
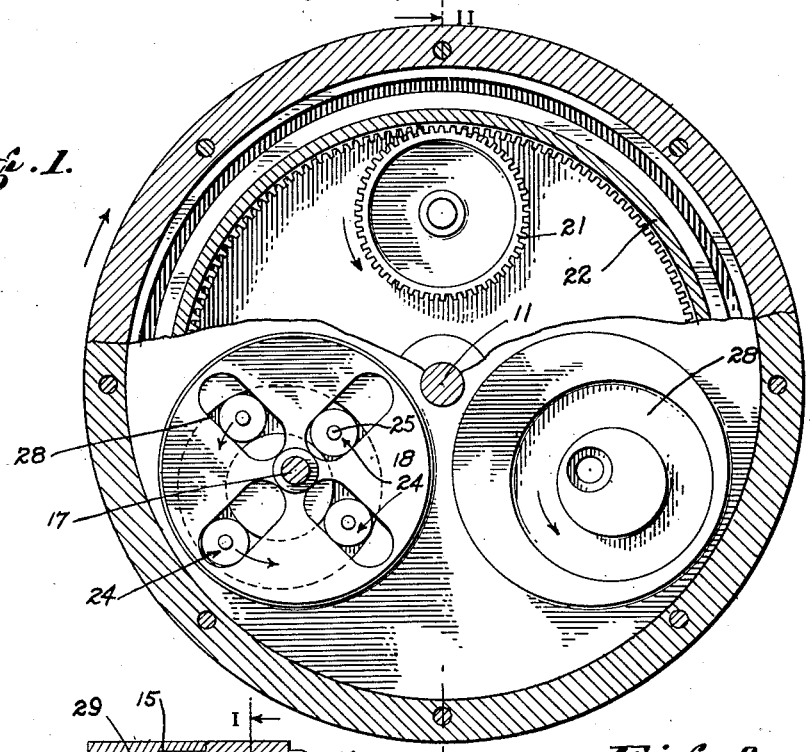

Feb. 12, 1929.  
C. C. RHODES  
1,701,823  
POWER TRANSMISSION DEVICE  
Filed April 18, 1928

INVENTOR.  
Carl C. Rhodes.  
BY Townsend, Loftus & Abbett  
ATTORNEYS.

Patented Feb. 12, 1929.

1,701,823

UNITED STATES PATENT OFFICE.

CARL C. RHODES, OF SAN FRANCISCO, CALIFORNIA.

POWER-TRANSMISSION DEVICE.

Application filed April 18, 1928. Serial No. 270,841.

My present invention relates to power transmission, and involves a novel method and apparatus adapted for the transmission of power for various purposes and in various situations, especially where the load or speed is variable, for example, as with motor vehicles.

The general object hereof is to enable changes of speed ratio between the driving member or shaft and the driven member or shaft, not by any step by step adjustment, but by gradual or continuous changes through all intermediate ratios, and preferably from unity ratio down to zero speed of the driven shaft. Moreover the general plan is to secure a readjustment of the speed or ratio to correspond to the conditions or load in a self acting manner, without the manipulations of the usual clutch and gear shift, or other attention by the operator. Thus, for example, in the driving of a motor vehicle when the road conditions change the operation is that the speed ratio and torque will accommodate themselves so as to give the most effective results; whereby with any given conditions of resistance or load on the driven parts the maximum driven speed thereof will be attained which is consistent with the conditions of speed and power in the engine at the time, as determined by the throttle or otherwise. If the vehicle should encounter an increase of grade, this increases the load on the driven shaft, thus slowing down the vehicle and the shaft; and this invention utilizes this slowing down, and the consequent increase of speed difference in the driving and driven members, to effect an alteration in the transmitting action such that the required increased torque is delivered, and without the need of attention by the operator. A great range of speed ratio and torque is permitted. When the load is sufficiently light the driven shaft may be rotated at the full speed of the driving shaft, or with a speed ratio of one to one, under which conditions the entire mechanism may rotate as a unit and there will be no play or internal motion of the parts of the transmission and consequently no wear. On the other hand, with increase of load, the ratio may decrease toward or substantially to zero. Control by the engine throttle is additional or supplemental to the self control of the transmission, and by manipulating the throttle the operator can at will increase or decrease the developed power, and speed up or slow down the engine and therefore the driven shaft, this being the only attention required for driving the vehicle under varying conditions.

The class of transmission to which the present invention relates is that in which a mass or body, centrifugally acted upon, is movably mounted on the driving member or fly wheel so as to be carried around therewith, subject to centrifugal force, while controlled in its movement from the driven member or shaft, being compelled to move inwardly or against the centrifugal force, when the two shafts are turning at different speeds, so that the centrifugal force is applied to the driven shaft to overcome the load thereon. In such class of apparatus a difficulty has been the proper manipulation or disposal of the mass or body at the completion of its inward or operative transmitting movement. In one prior invention this was taken care of through the use of a succession or procession of mass portions or bodies, not united with but engaging the device or carrier on the driving member, and compelled to move inwardly in succession by the device or carrier in such a way that there is always an inward forcing action, so that there will be a continuous centrifugal force action applied to deliver torque to the driven shaft; each mass portion or body being discharged from the carrier, or at least ceasing its operative co-action, at the completion of its inward movement, and thereupon returning outwardly in a second or inoperative phase. This inoperative phase or outward return movement of each mass or body constituted a factor requiring either the use of a second carrier to conduct the successive masses outwardly and there restore them to the main carrier, or requiring the loose discharge of the bodies with resultant loss of energy and liability to wear, vibration or injury.

The present invention is distinguished from the prior apparatuses mentioned, and from all other known prior apparatuses in the fact that the mass or body, or each of them if there be a number, constitutes, with its carrier, and the connections to the driven shaft, a complete transmitting means, in which the centrifugal force is operative with substantial continuity to oppose the driven shaft load, and thereby effect substantially continuous transmission of torque from the driving to the driven shaft, with all the advantages of self adjustment to conditions as before described. This result is effected by employing a controlling or guiding means for the mass or bodies such as to afford an operation at substantially all times and phases by which the mass is constrained, deflected or diverted inwardly from its natural path, so that the centrifugal force of the mass is always opposed to the planetating or other movement of its control means or carrier, and is thereby opposed to the driven shaft load.

In one way the principle of the present invention may be stated as involving a device or carrier which is carried around bodily with the rotation of the driving member, and with a mass or body arranged to engage with the device or carrier, and connections from the driven member such that the speed difference of the driving and driven members actuates or planetates the device or carrier thereby and compels the mass or body to travel, as it is carried around the general axis, in a path which differs at substantially all times from the natural or free path thereof in such a way as to give reactions whereby this centrifugal force tends to resist the stated actuation of the device or carrier, whereby torque will be delivered in one direction only to the driven shaft. The device or carrier is preferably a planetating guide for the mass or body, operating always to divert, deflect or constrain the mass inwardly against the tendency of centrifugal force, so that in this way the centrifugal force is utilized as a continuously active principle by which rotary energy or torque is transmitted to the driven shaft. Each carrier with its mass or body constitutes a substantially complete transmitting system, delivering substantially continuous thrust to the driven shaft. The play of the parts and the extent of operation of the carrier and mass will vary, becoming less as the driven shaft speed approaches that of the driving shaft, so that if the load be not too heavy, in view of the existing engine speed and centrifugal force, the two shafts may turn at the same speed, without any internal motion of the carrier or mass, the centrifugal force of the latter then operating to hold the parts substantially in a definite relation. The improvement is believed to be novel as a method of transmission, and the mechanical embodiment thereof is believed to be generically new.

The effectiveness of each mass as a transmitting instrument is increased by increasing its weight, giving greater centrifugal force and torque delivery, and, according to the law of centrifugal force, the effectiveness is greatly enhanced by increasing speed of rotation, the force increasing with the square of the speed, as the engine is speeded up.

The further and more detailed features and principles of the present invention will be hereinafter explained more fully in connection with the specific embodiment to be described for the purposes of illustration of such principles. In addition to the objects and advantages above referred to other objects and advantages will be elucidated in the following description or will be apparent to those skilled in the art.

In the drawing—

Figure 2:
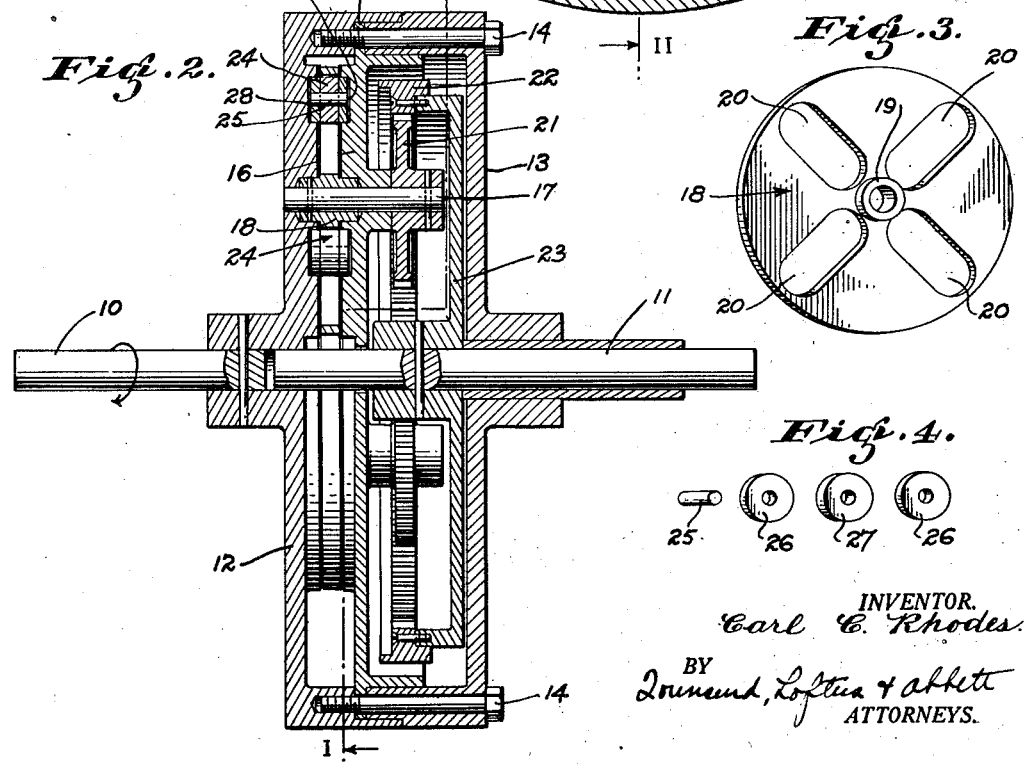
Figure 3:
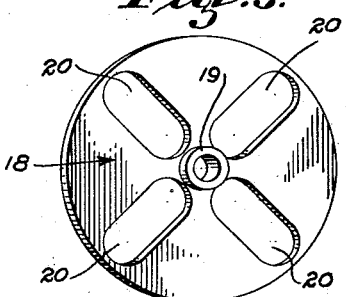
Figure 4:

Figure 1 is a fragmentary sectional view of my device taken along line I—I of Figure 2, Figure 2 is a sectional view of my device taken along line II—II of Figure 1, Figure 3 is a perspective view of the rotatable weight carrying member of my device, and Figure 4 is an exploded view of a preferred form of weight element.

In the drawing 10 designates a driving shaft and 11 designates a driven shaft. The driving shaft 10 carries a member 12, which, in cooperation with a similar member 13, forms an enclosing housing for the working elements of my device The member 12 is secured firmly to the shaft 10 and the member 13 rotates freely about the shaft 11. These members are secured together by means of bolts 14 and at their junction they engage an outstanding flange 15 of an intermediate member 16. The members 12 and 16 are provided with a plurality of similar and opposed raised portions arranged concentrically about the axis of the shafts 10 and 11 and centrally of these raised portions, stub shafts 17 are mounted so that they will be freely mountable upon journals formed in the members 12 and 16. The stub shafts 17 carry rotatable members 18 which are securely fastened thereto. The rotatable member 18 (better shown in Figure 3) is provided with a hub portion 19 and four radially projecting slots or openings 20, the function of which will be explained in more detail hereinafter. This member 18 rotates between the opposed surfaces of the raised portions previously referred to and located upon the members 12 and 16. The stub shafts 17 also carry upon their projecting ends gears 21 which are keyed securely thereto. The gears 21 mesh with an internal gear or toothed ring 22 which is mounted upon a rotatable member 23 carried upon and securely fastened to the shaft 11 so that it will transmit torque from the driving shaft 10 to the driven shaft 11, as will be hereinafter pointed out.

Referring now again to the rotatable member 18 and its cooperation with the raised portions upon the members 12 and 16. The slots 20 of the member 18 are each provided with a weight element 24 which, in the present instance, is shown in Figure 3 as comprising a short shaft 25 and three cooperating weight members, two designated by the numeral 26 and a third by 27. These elements or weights 24 are arranged with their axis parallel to the axis of the stub shaft 17 and they are adapted to move radially in the slots 20 with a rolling contact as they function in a manner as will hereinafter appear. The axial dimension of each weight 24 is such that its ends will project outwardly from the surface of the member 18 into grooves or raceways 28 and 29 located respectively in the members 12 and 16. The grooves or raceways 28 and 29 are located so that they coincide with each other and are formed to a true circle, but eccentric with the axis of rotation of the rotatable member with their inner portion, with respect to the axis of the shafts 10 and 11, nearest the stub shaft 17 so that as the rotatable member 18 rotates between the members 12 and 16 the weights will be caused to move in and out radially in their respective slots 20. In Figure 1 of the drawing the lower right hand sector illustrates the arrangement of the raceways upon the member 12 and the lower left hand sector of this figure shows a rotor element 18 with its cooperating weights placed in its cooperating position with one of the raceways, in this instance the raceway 28. There are three sets of rotor units provided in the particular modification chosen for the purpose of illustrating my invention.

The operation of my device is as follows, assuming that the shaft is connected to a stationary load about to be started and that the driving shaft 10 is connected to a prime mover, as for instance, an automobile engine. When the shaft 10 begins to turn over together with its attached casing 12, the stub shafts 17 will move about the axis of the driving and driven shafts and the gear 21, by reason of its engagement with the internal gear 22, will rotate with a planetating movement about the main drive shaft. This will cause the members 18 to also rotate in a similar fashion and the weights will therefore also be carried around with the members 18 and as a result, they will exert a force due to centrifugal action which will tend to throw them outwardly from the axis of the stub shaft 17, but as these weights are moved with their ends engaging the raceways 28 and 29 they will be constrained inwardly toward the axis about which they rotate against the forces due to the centrifugal action and a component of the centrifugal force exerted by the weights will be transmitted by reason of the aforesaid raceways to the portions 12 and 16 and will react to retard the movement of the member 18 about its axis. This retarding action will in turn be transmitted to the gear 21 and, as a result, the internal ring gear 22 will pick up speed, and, as a result, the driven shaft 11 will be rotated correspondingly. This action will continue until the forces exerted by the weights upon the raceways 28 and 29 counterbalance the torque transmitted through the internal gear 22. As soon as the internal gear 22 has gained sufficient speed so that it will be rotating at substantially the same speed as the members 12 and 16, or in other words stationary with respect thereto, it will be seen that there will be no further rotation of the stub shaft 17 and, as a result, the weights will then cease to act centrifugally about the shaft 17 as an axis, but by this time the casing formed by the members 12 and 13 will be rotating at such a speed that there will be a centrifugal action created by the weights by reason of their rotation about the main axis of the drive and at this time or some time prior, depending upon the relative speeds between the stub shaft 17 and the main drive shaft, the centrifugal forces created by the weights will change with respect to their center of rotation and since the centrifugal force created by a weight varies as the square of the distance of its center of rotation, it will be seen that this arrangement is particularly suitable for a device of the character under consideration as it will change the weights from movement in a small circle to movement in a larger circle, which, in fact, means that their centrifugal action will be increased at a time when such a change is desirable.

While I have shown the preferred form of my invention as now known to me, it is to be understood that various changes may be made in its construction without departing from the spirit of the invention as defined in the appended claims.

Having thus described my invention, what I claim and desire to secure by Letters Patent is—

1. In a power transmitting device, the combination of a driving member, a driven member, an internal gear upon said driven member, a gear rotatably mounted upon the driving member and meshing with said internal gear, a rotatable member secured to and rotatable with the gear upon said driving member, weights cooperating with said movable member, and means upon said driving member adjacent said rotatable member for constraining said weights to a path eccentric to their normal path of travel about the axis of the driving and driven members, whereby torque will be transmitted from said driving to said driven member.

2. In a power transmitting device, the combination of a driving member, a driven member, an internal gear upon said driven member, a gear rotatably mounted upon the driving member and meshing with said internal gear, a rotatable member secured to and rotatable with the gear upon said driving member, weights cooperating with said movable member and projecting outwardly on both sides thereof, and raceways eccentric to the axis of said rotatable member into which the projecting ends of said weights project whereby said weights will be constrained to a path eccentric to the axis of said rotatable member and transmit a driving force from said driving to said driven member.

3. In a power transmitting device, the combination of a driving member, a driven member, an internal gear upon said driven member, a gear rotatably mounted upon the driving member and meshing with said internal gear, a rotatable member secured to and rotatable with the gear upon said driving member, radially arranged slots through said rotatable member, weights located within said radial slots and extending therefrom on both sides thereof parallel with the axis of said rotatable member, and eccentric raceways adjacent both sides of said rotatable member and engaging the ends of said weights whereby said weights will be constrained to a path eccentric to the axis of rotation of said rotatable member and transmit a driving force from said driving to said driven member.

4. In a power transmitting device, the combination of a driving member, a driven member, an internal gear upon said driven member, a plurality of gears rotatably mounted upon the driving member and meshing with said internal gear, a plurality of rotatable members secured to and rotatable with the gears upon said driving member, weights cooperating with said movable members, and a plurality of equally spaced eccentric raceways upon said driving member adjacent said rotatable members for constraining said weights to a path eccentric to their normal path about the axis of said rotatable members whereby torque will be transmitted from said driving to said driven member.

5. In a power transmitting device, the combination of a driving member, a driven member, a plurality of rotatable members mounted concentric with the axis of said driving member, a gear upon said rotatable members in driving connection with said driven member, radially movable weights carried by said rotatable member and eccentric raceways adjacent said rotatable member and cooperating with said weights whereby the latter will be constrained to a circular path eccentric with the axis of rotation of said rotatable member whereby a variable torque will be transmitted from said driving member to said driven member as determined by the relative speed between said latter members.

CARL C. RHODES.